(12) United States Patent
Schalk-Schupp et al.

(10) Patent No.: US 10,477,031 B2
(45) Date of Patent: Nov. 12, 2019

(54) SYSTEM AND METHOD FOR SUPPRESSION OF NON-LINEAR ACOUSTIC ECHOES

(71) Applicant: Nuance Communications, Inc., Burlington, MA (US)

(72) Inventors: Ingo Schalk-Schupp, Ulm (DE); Markus Buck, Biberach (DE); Friedrich Faubel, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/781,887

(22) PCT Filed: Dec. 8, 2015

(86) PCT No.: PCT/US2015/064493
§ 371 (c)(1),
(2) Date: Jun. 6, 2018

(87) PCT Pub. No.: WO2017/099728
PCT Pub. Date: Jun. 15, 2017

(65) Prior Publication Data
US 2018/0367674 A1    Dec. 20, 2018

(51) Int. Cl.
*H04M 9/08* (2006.01)
*G10L 21/0232* (2013.01)
(Continued)

(52) U.S. Cl.
CPC ......... *H04M 9/082* (2013.01); *G10L 21/0232* (2013.01); *G10L 21/0264* (2013.01);
(Continued)

(58) Field of Classification Search
CPC ..... H04M 9/082; H04M 9/08; G10L 21/0232; G10L 21/0264
(Continued)

(56) References Cited

U.S. PATENT DOCUMENTS 9,445,375 B2 *  9/2016  Xiong .................. H03F 1/3247
2003/0185402 A1  10/2003  Benesty et al.
(Continued)

FOREIGN PATENT DOCUMENTS

EP    1 538 867 B1    7/2012

OTHER PUBLICATIONS

International Search Report and Written Opinion issued in PCT Application Serial No. PCT/US2015/064493 dated Feb. 23, 2016 (8 pages).

*Primary Examiner* — Md S Elahee
(74) *Attorney, Agent, or Firm* — Ohlandt, Greeley, Ruggiero & Perle, L.L.P.

(57) ABSTRACT

A method for residual echo suppression is provided. Embodiments may include receiving an original reference signal and applying a distortion function to the original reference signal to generate a second signal. Embodiments may include generating a non-linear signal from the distortion function that does not include linear components of the original reference signal. Embodiments may also include calculating a residual echo power of a linear component and a non-linear component, wherein the linear component is based upon the original reference signal and the non-linear component is based upon the non-linear signal. Embodiments may further include applying a room model to each of the original reference signal and the non-linear signal and estimating a power associated with the original reference signal and the non-linear signal. Embodiments may include calculating a combined echo power estimate as a weighted sum of a weighted original reference signal power and a weighted non-linear signal power.

20 Claims, 14 Drawing Sheets

(51) Int. Cl.
*G10L 21/0264* (2013.01)
*G10L 21/0208* (2013.01)
*H04M 1/60* (2006.01)

(52) U.S. Cl.
CPC ..... H04M 9/08 (2013.01); *G10L 2021/02082* (2013.01); *H04M 1/6041* (2013.01); *H04M 2201/40* (2013.01)

(58) Field of Classification Search
USPC ........................................ 379/406.01–406.05
See application file for complete search history.

(56) References Cited

U.S. PATENT DOCUMENTS

2015/0350777 A1    12/2015   Yang et al.
2016/0225385 A1*    8/2016   Hammarqvist ..... G10L 21/0208

* cited by examiner understand# SYSTEM AND METHOD FOR SUPPRESSION OF NON-LINEAR ACOUSTIC ECHOES

CROSS-REFERENCE TO RELATED APPLICATION

This application is a U.S. National Stage of International Patent Application No. PCT/US2015/064493, filed 8 Dec. 2015, the disclosure of which is incorporated herein by reference in its entirety.

TECHNICAL FIELD

This disclosure relates to signal processing and, more particularly, to a method for suppression of non-linear acoustic echoes.

BACKGROUND

Acoustic echo control is a key processing step for many speech applications such as automated speech recognition (ASR) with barge-in or hands-free telephony. Existing solutions apply a combination of acoustic echo cancellation (AEC) and residual echo suppression (RES). Both of these methods rely on the assumption of a strictly linear acoustic echo path. In many practical applications, however, nonlinear behavior of the loudspeaker or amplifier distorts the signal. This is especially true for low-cost audio systems and/or high playback levels. The resulting nonlinear distortion cannot be compensated by AEC and RES. As a consequence, echo artifacts remain in the processed output signal. This degrades voice recognition results and sounds very annoying in hands-free telephony.

SUMMARY OF DISCLOSURE

In one implementation of the present disclosure, a method for residual echo suppression is provided. The method may include receiving an original reference signal and applying a distortion function to the original reference signal to generate a second signal. The method may include generating a non-linear signal from the distortion function that does not include linear components of the original reference signal. The method may also include calculating a residual echo power of a linear component and a non-linear component, wherein the linear component is based upon the original reference signal and the non-linear component is based upon the non-linear signal. The method may further include applying a room model to each of the original reference signal and the non-linear signal and estimating a power associated with the original reference signal and the non-linear signal. The method may include calculating a combined echo power estimate as a weighted sum of a weighted original reference signal power and a weighted non-linear signal power.

One or more of the following features may be included. In some embodiments, the application of the room model may include convolving each of the original reference signal and the non-linear signal with a room impulse response. The room impulse response may be estimated using a linear echo canceller. At least one of the weighted original reference signal power and the weighted non-linear signal power used in the weighted sum may include one or more coupling factors. The coupling factors may differ between the linear component and the non-linear component. In some embodiments, a magnitude may be used instead of the power. The distortion function may be estimated based upon, at least in part, a coupling factor associated with the non-linear signal. The coupling factor may include at least one of broadband or an individual frequency band calculation. Generating a non-linear signal may include subtracting the original reference signal from the second signal to generate a non-linear signal. The distortion function may be approximated by a polynomial and wherein one or more coefficients of the polynomial may be estimated based upon, at least in part, a correlation between a plurality of monomials and a cross-correlation of each of the plurality of monomials with the original reference signal.

In another implementation, a system for residual echo suppression is provided. The system may include a speaker a microphone, and a processor configured to perform one or more operations. Some operations may include receiving an original reference signal and applying a distortion function to the original reference signal to generate a second signal. Operations may include generating a non-linear signal from the distortion function that does not include linear components of the original reference signal. Operations may also include calculating a residual echo power of a linear component and a non-linear component, wherein the linear component is based upon the original reference signal and the non-linear component is based upon the non-linear signal. Operations may further include applying a room model to each of the original reference signal and the non-linear signal and estimating a power associated with the original reference signal and the non-linear signal. Operations may include calculating a combined echo power estimate as a weighted sum of a weighted original reference signal power and a weighted non-linear signal power.

One or more of the following features may be included. In some embodiments, the application of the room model may include convolving each of the original reference signal and the non-linear signal with a room impulse response. The room impulse response may be estimated using a linear echo canceller. At least one of the weighted original reference signal power and the weighted non-linear signal power used in the weighted sum may include one or more coupling factors. The coupling factors may differ between the linear component and the non-linear component. In some embodiments, a magnitude may be used instead of the power. The distortion function may be estimated based upon, at least in part, a coupling factor associated with the non-linear signal. The coupling factor may include at least one of broadband or an individual frequency band calculation. Generating a non-linear signal may include subtracting the original reference signal from the second signal to generate a non-linear signal. The distortion function may be approximated by a polynomial and wherein one or more coefficients of the polynomial may be estimated based upon, at least in part, a correlation between a plurality of monomials and a cross-correlation of each of the plurality of monomials with the original reference signal.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards a system and process for performing acoustic echo control. In some embodiments, a device having a loudspeaker unit, a microphone unit, and a processing unit may reside in an environment that modifies and reflects the device's loudspeaker signal back into the device's microphone unit. Both the intended loudspeaker signal and the recorded microphone signal may be available to the processing unit. It is the desired outcome to process the microphone signal such that any influence the loudspeaker signal might have on the microphone signal is minimized while preserving the quality of any desired local signal, such as local speech. Other modules in the processing unit may be configured to further reduce local noise components.

Figure 1:
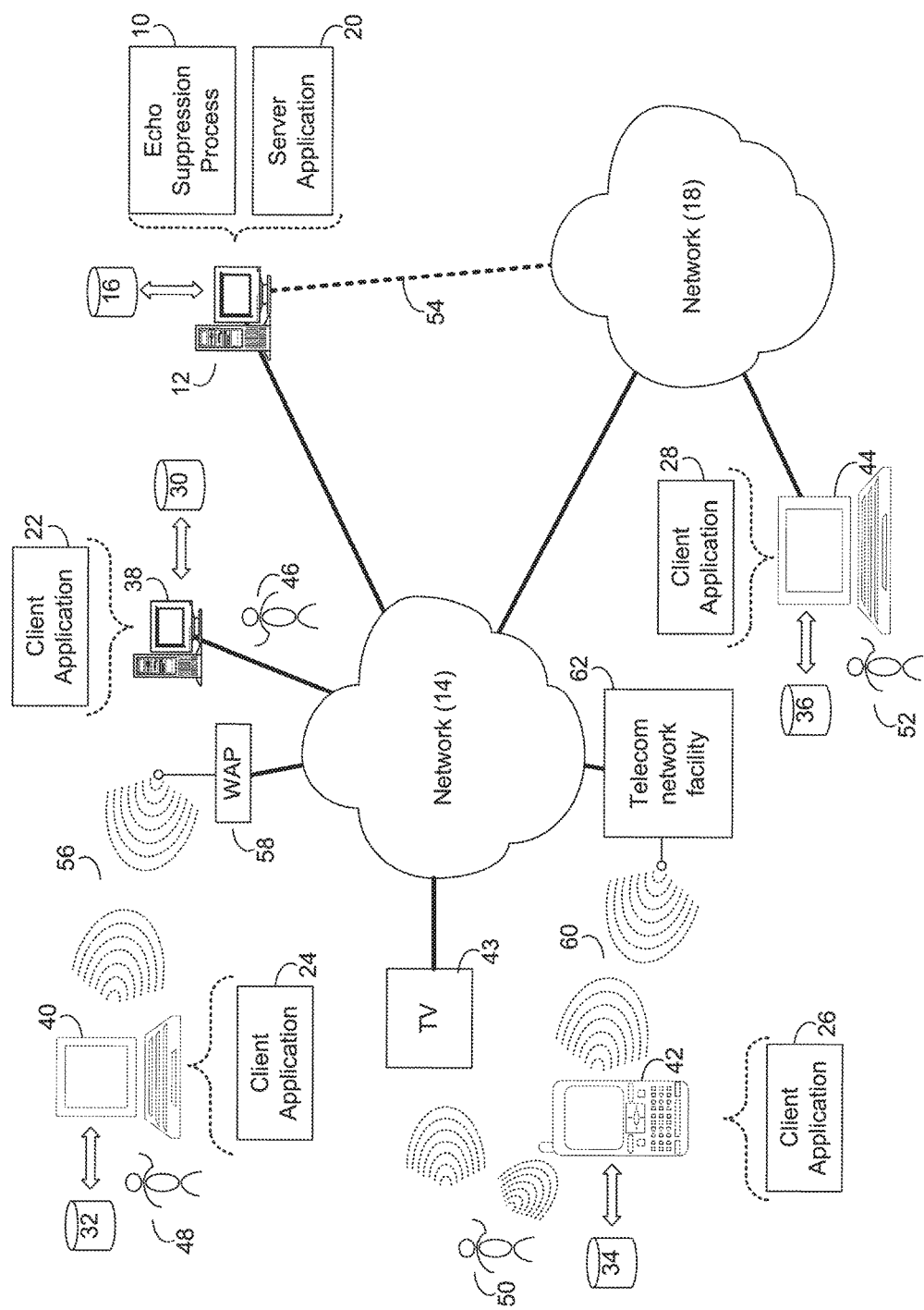
FIG. 1 is a diagrammatic view of an echo suppression process in accordance with an embodiment of the present disclosure.
Figure 2:
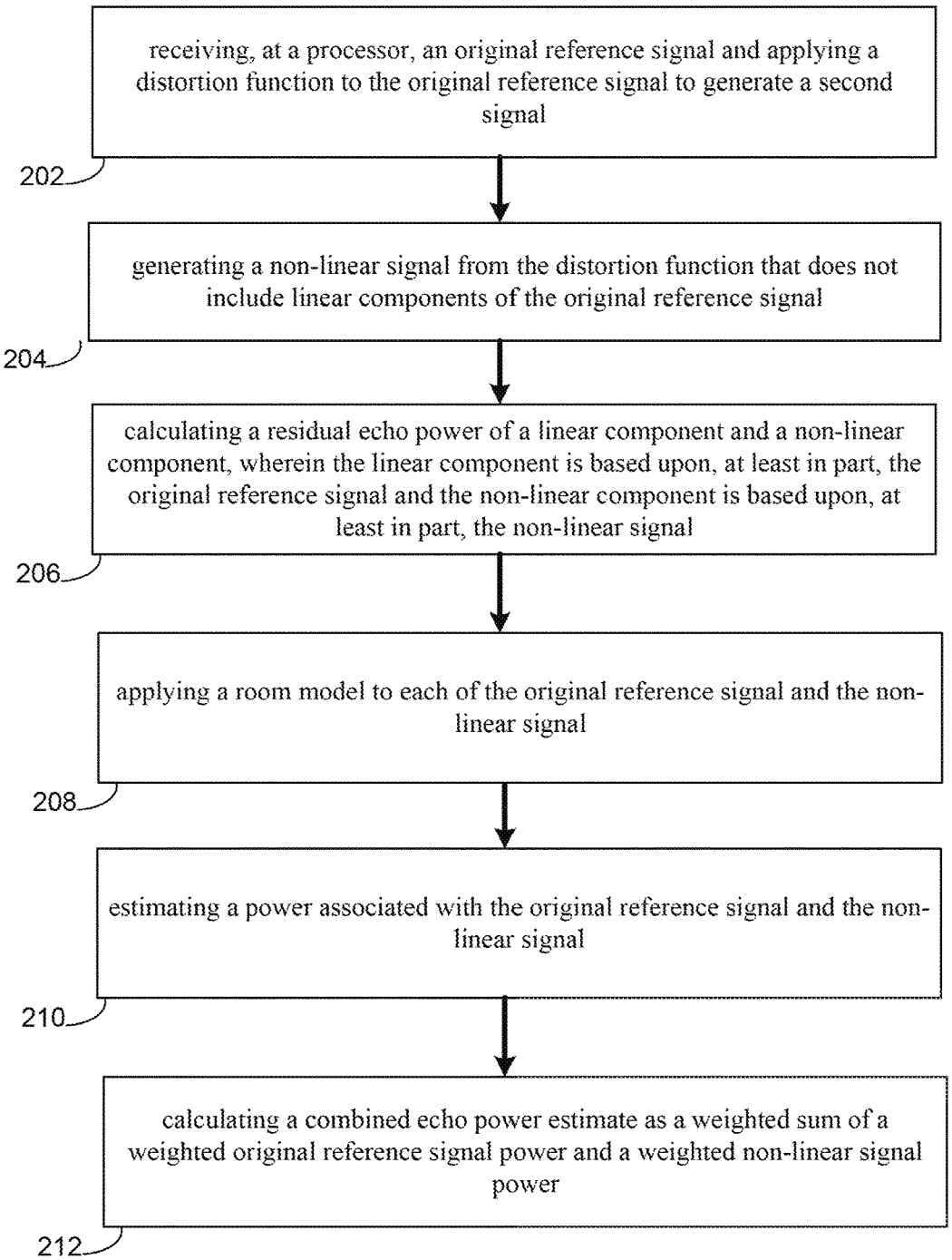
FIG. 2 is a flowchart of an echo suppression process in accordance with an embodiment of the present disclosure.

Referring to FIG. 1, there is shown an echo suppression process 10 that may reside on and may be executed by any of the devices shown in FIG. 1, for example, computer 12 (and/or any suitable device that includes a speaker and a microphone), which may be connected to network 14 (e.g., the Internet or a local area network). Server application 20 may include some or all of the elements of echo suppression process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

The instruction sets and subroutines of echo suppression process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, echo suppression process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). The examples of client electronic devices shown in FIG. 1 are merely provided by way of example as any suitable device may be used in accordance with the teachings of the present disclosure (e.g., those having a loudspeaker, microphone, and/or processor).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of echo suppression process 10. Accordingly, echo suppression process 10 may be a purely server-side application, a purely client-side application, or a hybrid server-side/client-side application that is cooperatively executed by one or more of client applications 22, 24, 26, 28 and echo suppression process 10.

Client electronic devices 38, 40, 42, 43, 44 may each execute an operating system, examples of which may include but are not limited to Apple iOS™, Microsoft Windows™, Android™, Redhat Linux™, or a custom operating system. Each of client electronic devices 38, 40, 42, 43, and 44 may include one or more microphones and/or speakers configured to implement echo suppression process 10 as is discussed in further detail below.

Users 46, 48, 50, 52 may access computer 12 and echo suppression process 10 directly through network 14 or through secondary network 18. Further, computer 12 may be connected to network 14 through secondary network 18, as illustrated with phantom link line 54. In some embodiments, users may access echo suppression process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 (or television remote control, etc.) and server computing device 12. Embodiments of echo suppression process 10 may be used with any or all of the devices described herein as well as many others.

As will be discussed below in greater detail in FIGS. 2-17, echo suppression process 10 may include receiving (202) an original reference signal and applying a distortion function to the original reference signal to generate a second signal. Embodiments may include generating (204) a non-linear signal from the distortion function that does not include linear components of the original reference signal. Embodiments may also include calculating (206) a residual echo power of a linear component and a non-linear component, wherein the linear component is based upon the original reference signal and the non-linear component is based upon the non-linear signal. Embodiments may further include applying (208) a room model to each of the original reference signal and the non-linear signal and estimating (210) a power associated with the original reference signal and the non-linear signal. Embodiments may include calculating (212) a combined echo power estimate as a weighted sum of a weighted power associated with the original reference signal and a weighted power associated with the non-linear signal.

As used herein, it should be noted that the short-time Fourier transform of an arbitrary time-discrete signal x is denoted by STFT (x(·))(k, $\ell$), with k being the sub-band index and $\ell$ the frame index. The inverse short-time Fourier transform of an arbitrary sub-band signal X is denoted by iSTFT(X(·,·))(nT). An estimator for the instantaneous power spectral density (PSD) of an arbitrary sub-band signal X is given by:

$$\hat{\Phi}_X(k,\ell) = |X(k,\ell)|^2. \qquad \text{Equation 1}$$

The expected value of a random variable x is denoted by $\varepsilon(x)$.

Figure 3:
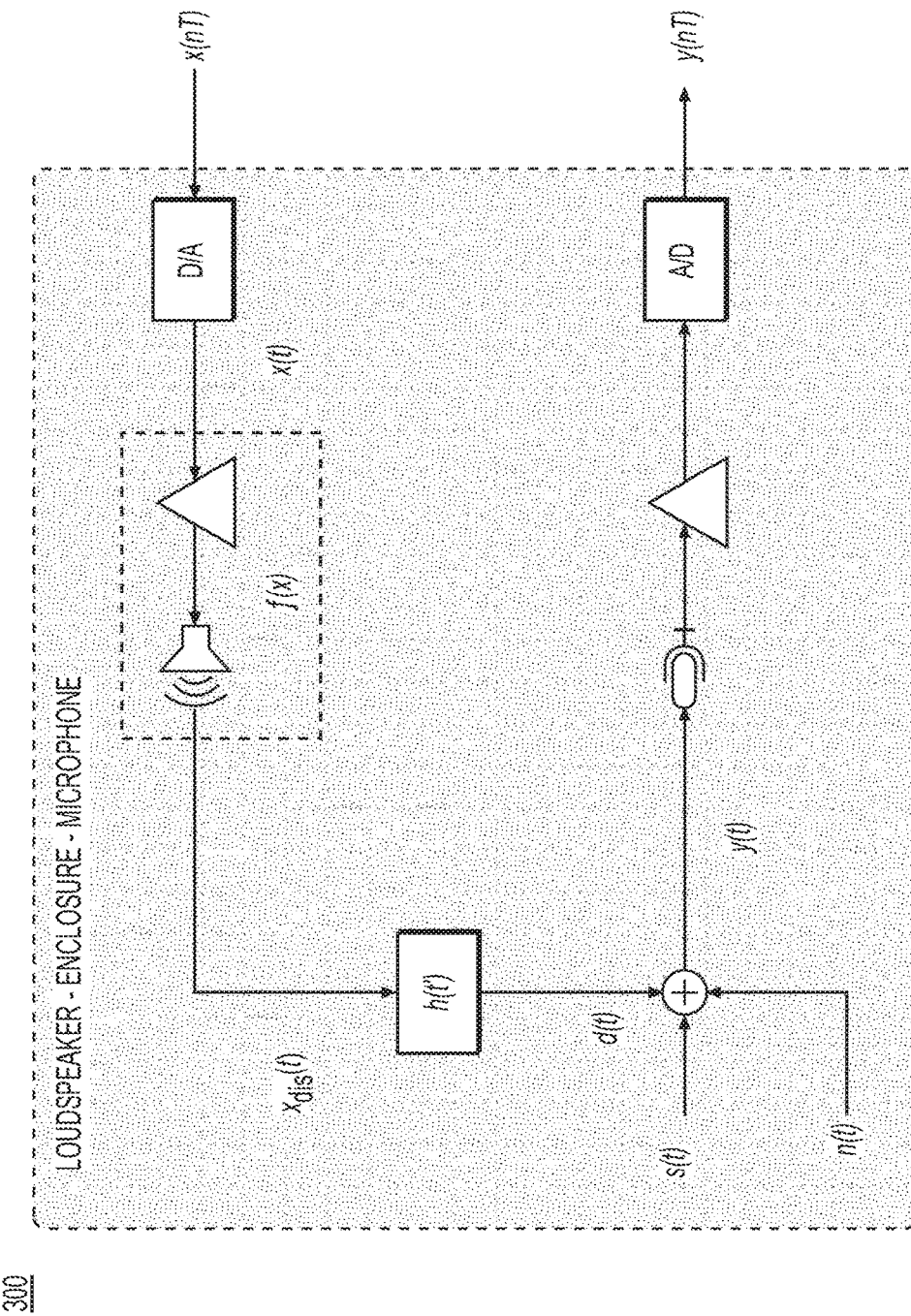
FIG. 3 is a diagrammatic view of a loudspeaker-enclosure-microphone system configured to implement an echo suppression process in accordance with an embodiment of the present disclosure.

Referring now to FIG. 3, an embodiment depicting a Loudspeaker-Enclosure-Microphone System (LEMS) is provided. From the processing unit's point of view, the echo path, or LEMS, may include the device's acoustic environment as well as the loudspeaker unit and the microphone unit as seen in FIG. 3. It may transform the reference signal x into the microphone signal y, which includes echo (d), noise (n) and speech (s) components additively:

$$y(t) = d(t) + n(t) + s(t). \qquad \text{Equation 2}$$

To good approximation, the loudspeaker may distort the signal by mapping the analog time-continuous reference signal's amplitude values x(t). This can be described by a saturation-type function $f$, with which the distorted signal $x_{dis}(t)$ can be expressed as:

$$x_{dis}(t) = f(x(t)). \qquad \text{Equation 3}$$

The distorted signal may traverse the environment and reaches the microphone. Also, signal portions may be reflected and/or scattered back into the microphone. This behavior is commonly modeled with convolution of the signal with a transversal filter called the room impulse response (RIR) h:

$$d(t) = (h * x_{dis})(t). \qquad \text{Equation 4}$$

If the distorted reference signal $x_{dis}$ is regarded as a sum of linear and nonlinear reference:

$$x_{dis} = x_{lin} + x_{nl} = x + (f(x) - x) \qquad \text{Equation 5}$$

then the echo signal D may be formally expressed as a sum of linear and nonlinear echo:

$$d = d_{lin} + d_{nl}. \qquad \text{Equation 6}$$

Figure 4:
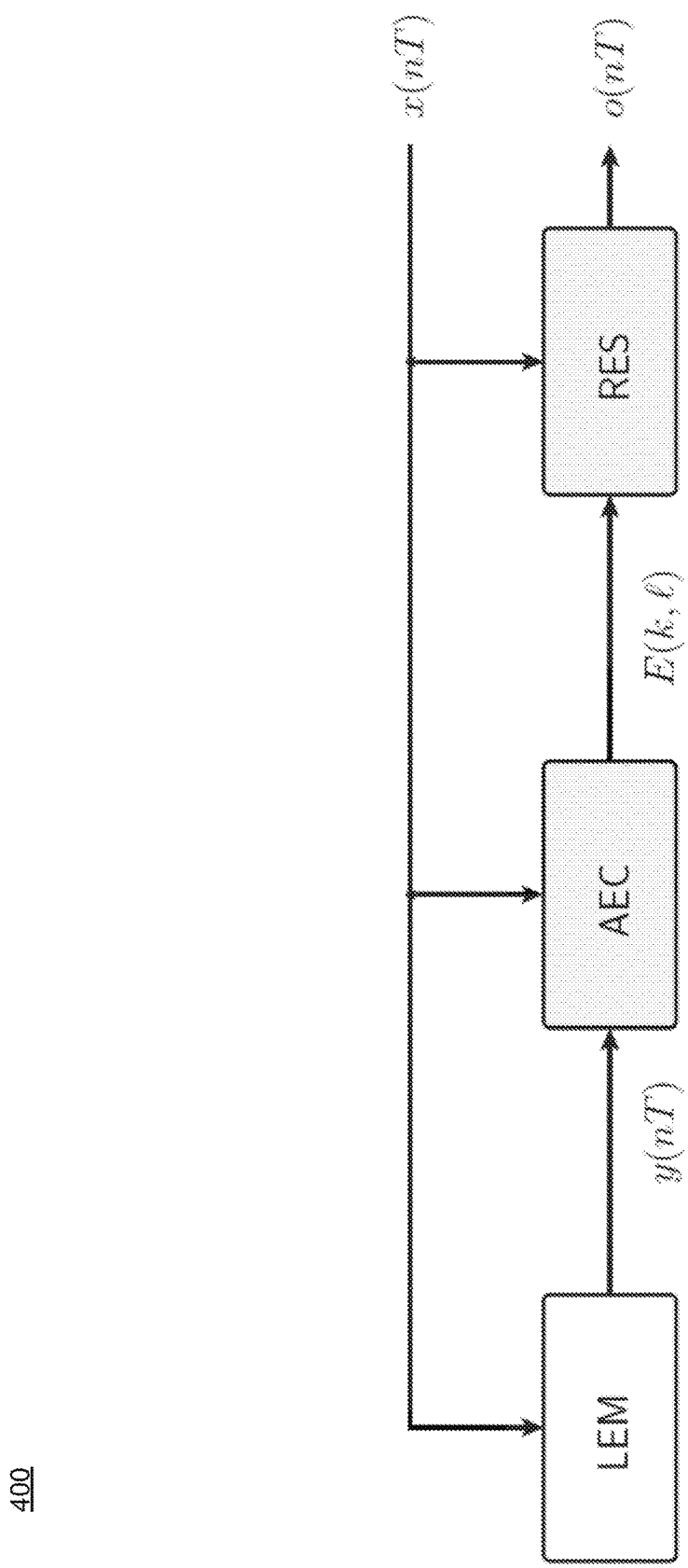
FIG. 4 is a diagrammatic view of an echo control system configured to implement an echo suppression process in accordance with an embodiment of the present disclosure.

Referring now to FIG. 4, an echo control scheme is depicted. Acoustic echo control can be divided in two types: cancellation and suppression. Echo cancellation subtracts an estimate $\hat{d}$ for the echo signal d from the microphone signal y, compare (8) below. This approach has the theoretical potential to perfectly negate the echo, but it is at the same time susceptible to estimation errors.

Figure 5:
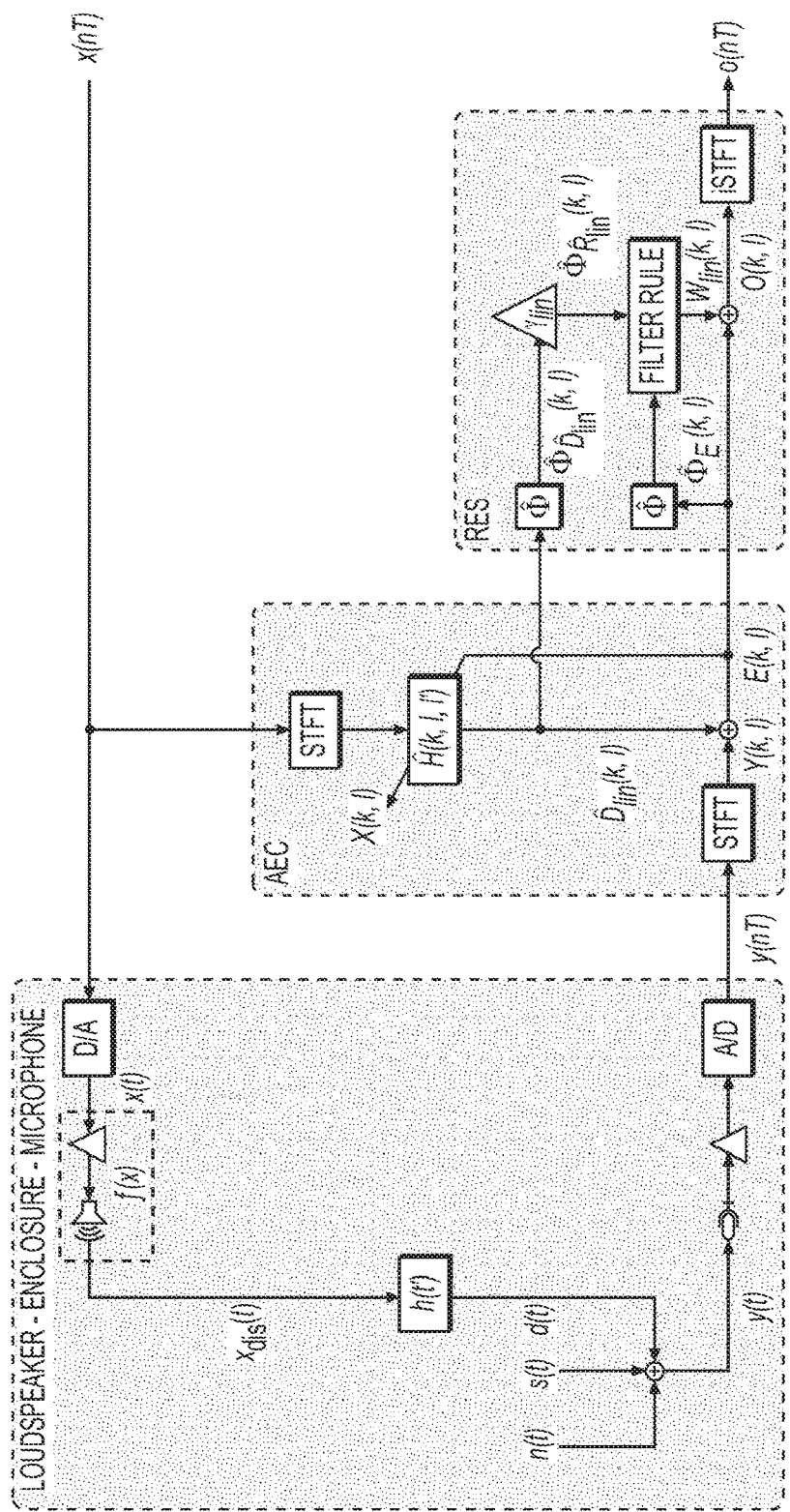
FIG. 5 is a diagrammatic view of an echo control system configured to implement an echo suppression process in accordance with an embodiment of the present disclosure.

However, since perfect estimation cannot be achieved in real-world scenarios, some residual echo remains in the AEC output signal E. Hence, the AEC may be used in cascade with an RES module producing the output signal o. Residual echo suppression selectively attenuates signal portions in the time-sub-band domain. Since it works multiplicatively, it necessarily attenuates both desired and undesired signal components. This results in a compromise between better echo suppression and loss of speech quality for local speech. A detailed version of this type of arrangement is shown in FIG. 5.

Ideally, the LEMS is a strictly linear component, and the RIR can be described by a linear transversal filter. Linear AECs estimate this filter or part of it to create an estimate $\hat{D}$ for the linear echo signal D by convolving the sub-band reference signal X with the estimated filter $\hat{H}$:

$$\hat{D}_{lin}(k,\ell) = (\hat{H} * X)(k,\ell) = \Sigma \ell'_{=0}{}^{L'-1} \hat{H}(k,\ell,\ell').$$
$$X(k,\ell-\ell'). \qquad \text{Equation 7}$$

The resulting linear echo estimate as $\hat{D}_{lin}$ is then subtracted from the microphone signal:

$$E(k,\ell)=Y(k,\ell)-\hat{D}_{lin}(k,\ell) \quad \text{Equation 8}$$

and the resulting residual error E is used for the adaptation of the filter coefficients, for example with the well-known normalized least-mean-square (NLMS) algorithm:

$$\hat{H}(k,\ell,\ell') = \hat{H}(k,\ell-1,\ell') + \frac{\mu(k,\ell)}{\sum_{\ell''=0}^{L'-1}|X(k,\ell-\ell'')|^2} \cdot E(k,\ell) \cdot X*(k,\ell-\ell'). \quad \text{Equation 9}$$

where $\mu(k,\ell)$ denotes the step size.

In this case, a well-converged linear AEC can compensate for the linear echo.

In the presence of loudspeaker distortion, however, i.e. regarding Equation 5, the sub-band representation of the AEC output E is given by:

$$E=S+N+D_{lin}-\hat{D}_{lin}+D_{nl}. \quad \text{Equation 10}$$

Figure 6:
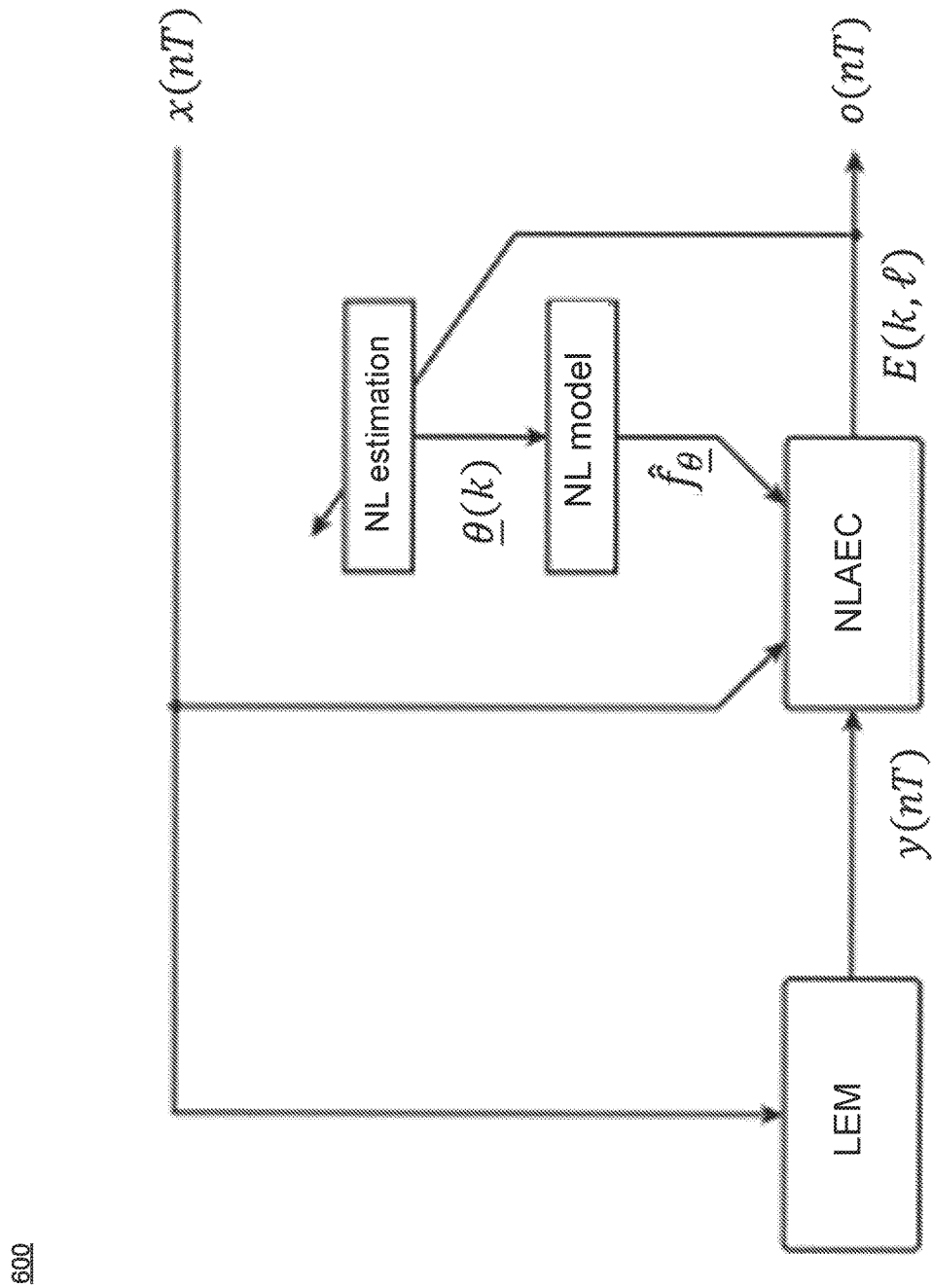
FIG. 6 is a diagrammatic view of an echo control system configured to implement an echo suppression process in accordance with an embodiment of the present disclosure.
Figure 7:
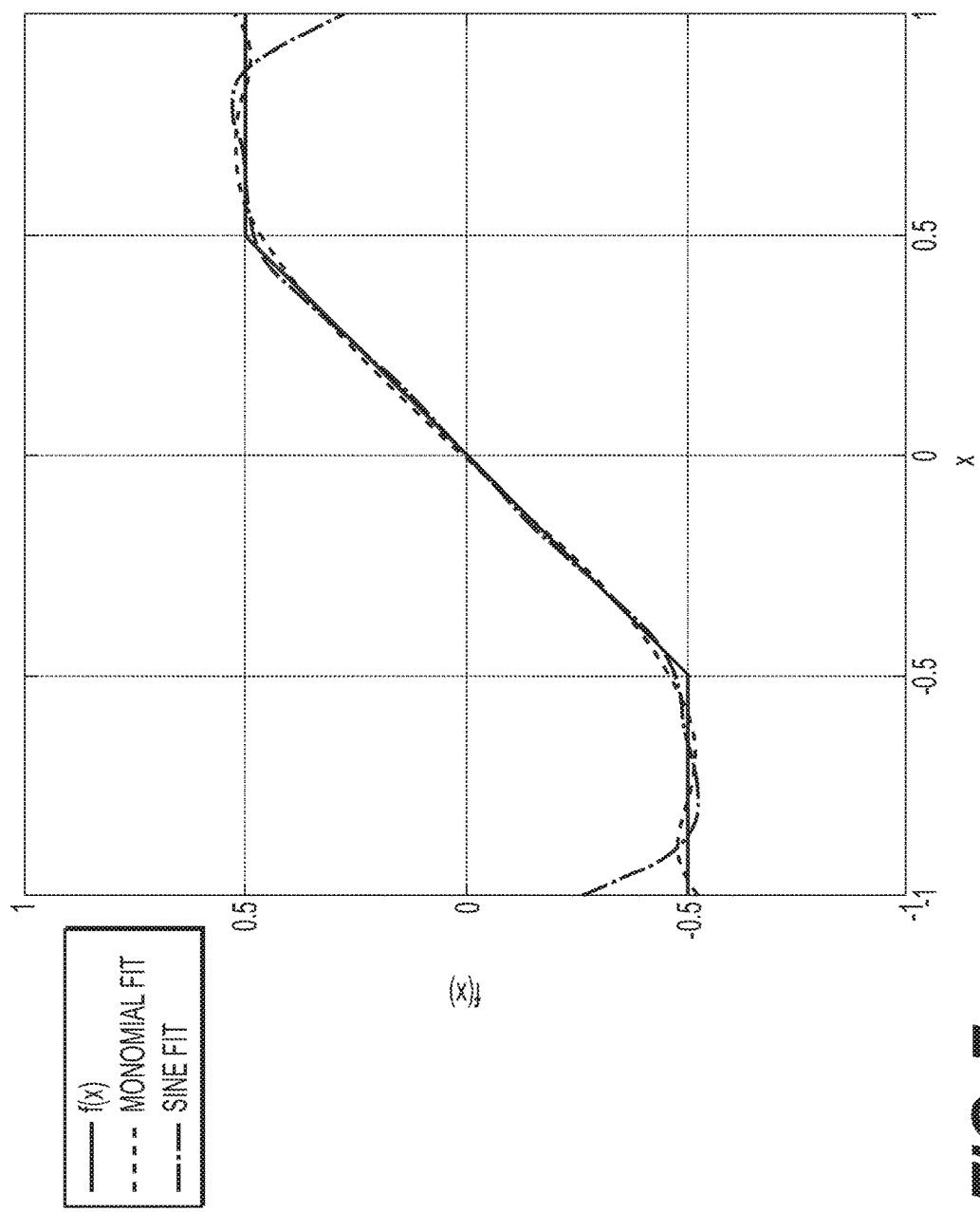
FIG. 7 is a diagrammatic view of an example distortion function in accordance with an embodiment of the present disclosure.

Several approaches for nonlinear echo cancellation exist, which additionally estimate the distortion function $f$, usually by assuming a parametric model for the estimated distortion function $f_\theta$ and estimating the parameter vector $\theta$. The estimated function may then be applied to the time-domain reference signal and the result may be convolved with the estimated RIR as in the linear AEC. A general setup is shown in FIG. 6. A sum of basis functions $f_i$ weighted with coefficients $\theta_i$ are used to approximate the true saturation-type function $f$:

$$\hat{f}_\theta(x)=\sum_{i=0}^{I-1}\theta_i \cdot f_i(x). \quad \text{Equation 11}$$

For example, the most commonly used basis consists of monomials:

$$f_i^{mon}(x)=x^i. \quad \text{Equation 12}$$

Other examples would be truncated odd Fourier series or piecewise linear functions. Compare FIG. 7 for a depiction of different basis function fits.

The residual echo may be split into a linear component $R_{lin}$ and a non-linear component $R_{nl}$ such that:

$$R=R_{lin}+R_{nl}. \quad \text{Equation 13}$$

so when there is no local signal S or N, and no nonlinear distortion exist, then AEC output E is exactly the residual linear echo signal $R_{lin}$:

$$S=0 \wedge N=0 \wedge D=D_{lin} \Rightarrow E=D_{lin}-\hat{D}_{lin}=R_{lin}. \quad \text{Equation 14}$$

Residual echo suppression works by estimating the power of the residual linear echo $\hat{\Phi}_{R_{lin}}(k,\ell)$ present in the AEC output $E(k,\ell)$. A filter rule then produces spectral attenuation coefficients $W(k,\ell)$ based on the PSD ratio. The best-known filter rule is the modified Wiener filter:

$$W_{lin}(k,\ell) = 1 - \frac{\hat{\Phi}_{R_{lin}}(k,\ell)}{\hat{\Phi}_E(k,\ell)}. \quad \text{Equation 15}$$

These coefficients are then multiplied with E:

$$O(k,\ell)=W(k,\ell) \cdot E(k,\ell). \quad \text{Equation 16}$$

Finally, the sub-band representation of the output signal may be transformed back to the time domain by an inverse STFT. Note that many different and modified filter rules exist.

Linear residual echo suppression estimates $\hat{\Phi}_{R_{lin}}(k,\ell)$ are calculated from the estimated echo signal's power $\hat{\Phi}_{\hat{D}_{lin}}(k,\ell)$ by multiplication with a per-sub-band weighting factor $\gamma_{lin}(k,\ell)$, which is usually identified with a coupling factor:

$$\hat{\Phi}_{R_{lin}}(k,\ell)=\gamma_{lin}(k,\ell) \cdot \hat{\Phi}_{\hat{D}_{lin}}(k,\ell). \quad \text{Equation 17}$$

The coupling factor represents the expected power resulting from the linear echo estimate $\hat{D}_{lin}$ that remains in the AEC output E. This is called the residual echo $R_{lin}$:

$$c_{lin} = \frac{\varepsilon(|R_{lin}|^2)}{\varepsilon(|\hat{D}_{lin}|^2)} \quad \text{Equation 18}$$

In practice, the coupling factor needs to be estimated. This must be done at times of local silence, compare Equation 14:

$$\hat{c}_{lin}(k,\ell) = \frac{\hat{\varepsilon}_{(|E(k,\ell)|^2)}}{\hat{\varepsilon}_{(|\hat{D}_{lin}(k,\ell)|^2)}} \quad \begin{vmatrix} S(k,\ell) \approx 0, \\ N(k,\ell) \approx 0, \\ D_{nl}(k,\ell) \approx 0. \end{vmatrix} \quad \text{Equation 19}$$

Since real-world signal characteristics change over time, the expectation operator must also be approximated. This can be done, e.g., by smoothing the signals under consideration over time:

$$\hat{\varepsilon}_{IIR}:\bar{\xi}(k,\ell):=\beta \cdot \bar{\xi}(k,\ell-1)+(1-\beta) \cdot \xi(k,\ell), \beta \in [0,1] \quad \text{Equation 20}$$

or by calculating the mean value over the past:

$$\hat{\varepsilon}_\Sigma : \bar{\xi}(k,\ell) := \frac{1}{\ell}\sum_{\ell'=0}^{\ell}\xi(k,\ell'). \quad \text{Equation 21}$$

Finally, the spectral weighting coefficients $\gamma_{lin}$ are set to match the estimated coupling factors to get an estimate residual PSD:

$$\hat{\Phi}_{R_{lin}}(k,\ell) = \hat{c}_{lin}(k,\ell) \cdot \hat{\Phi}_{\hat{D}_{lin}}(k,\ell). \quad \text{Equation 22}$$

Figure 8:
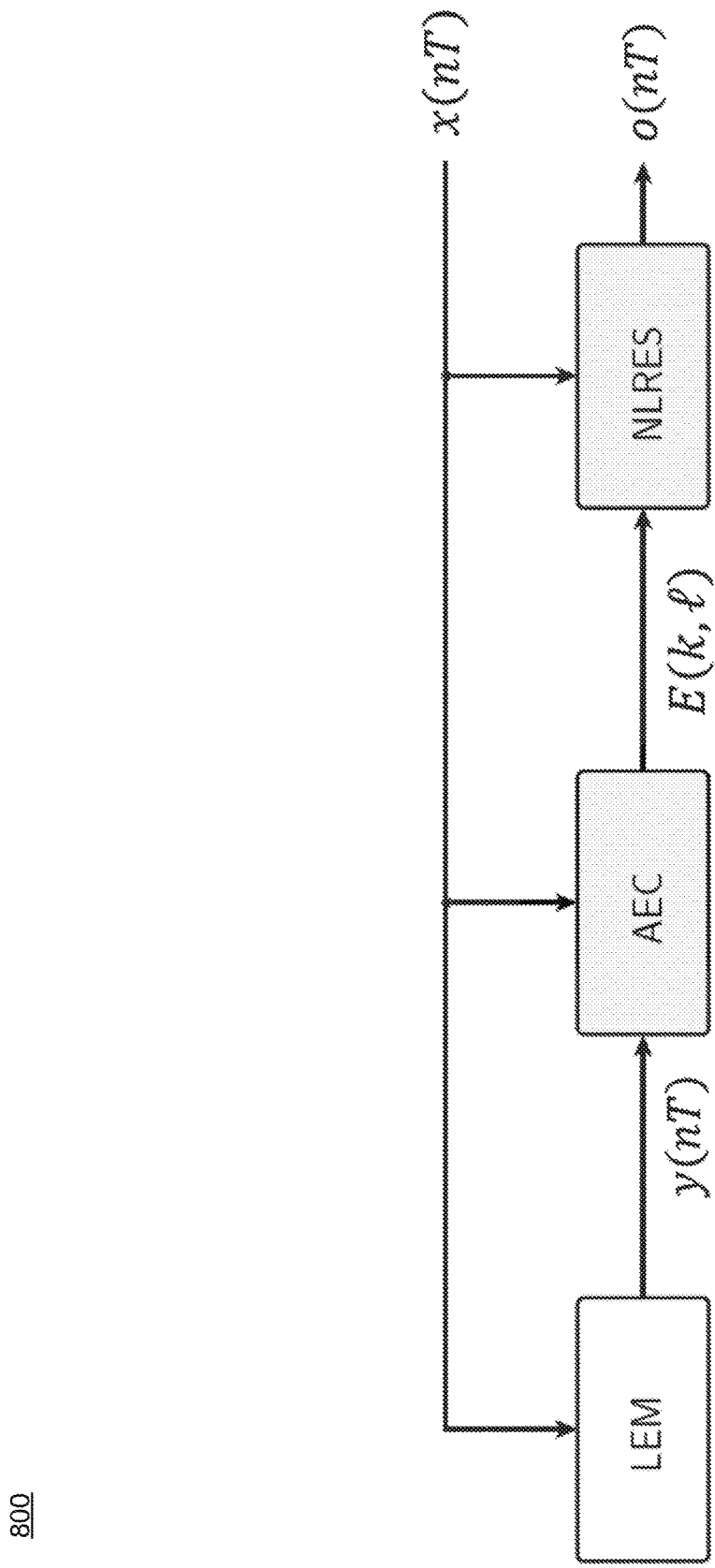
FIG. 8 is a diagrammatic view of an echo control system configured to implement an echo suppression process in accordance with an embodiment of the present disclosure.

There are a variety of approaches for nonlinear residual echo suppression. Some of these may include, but are not limited to, expensive power filters, harmonic models or neural networks. Some consider correlations between basis functions applied on the reference signal in the sub-band domain, but they do not retain long-term information about the distortion function. The general setup is depicted in FIG. 8, which depicts an example of an echo control scheme with linear AEC and nonlinear RES. The NLRES can also use a model of the nonlinear mapping function not depicted here.

When there is loudspeaker distortion, then the linear AEC's output signal E contains a residual echo R that comprises remaining residual linear echo $R_{lin}$ as well as nonlinear echo $R_{nl}$:

$$R=R_{lin}+R_{nl}. \quad \text{Equation 23}$$

The difference between the two is that the linear echo is attenuated by the AEC, while there is no such mechanism for the nonlinear echo:

$$R = D - \hat{D} = \underbrace{D_{nl}}_{=:R_{nl}} + \underbrace{D_{lin} - \hat{D}_{lin}}_{R_{lin}}.$$  Equation 24

As it is, they must be treated differently. In particular, the residual linear echo depends on the convergence state of the AEC's estimated filter, $\hat{H}$, while the residual nonlinear echo does not. As any RES conceptually works on powers rather than signals, residual linear and nonlinear echo power estimates $\hat{\Phi}_{\hat{R}_{lin}}$ and $\hat{\Phi}_{\hat{R}_{nl}}$ for the respective true residual echo powers $\Phi_{R_{lin}}$ and $\Phi_{R_{nl}}$ must be produced independently of each other to form a combined estimate residual echo power $\hat{\Phi}_{\hat{R}}$. Please note the circumflex notation in the index variable that tells the difference between an estimate and the true value.

Figure 9:
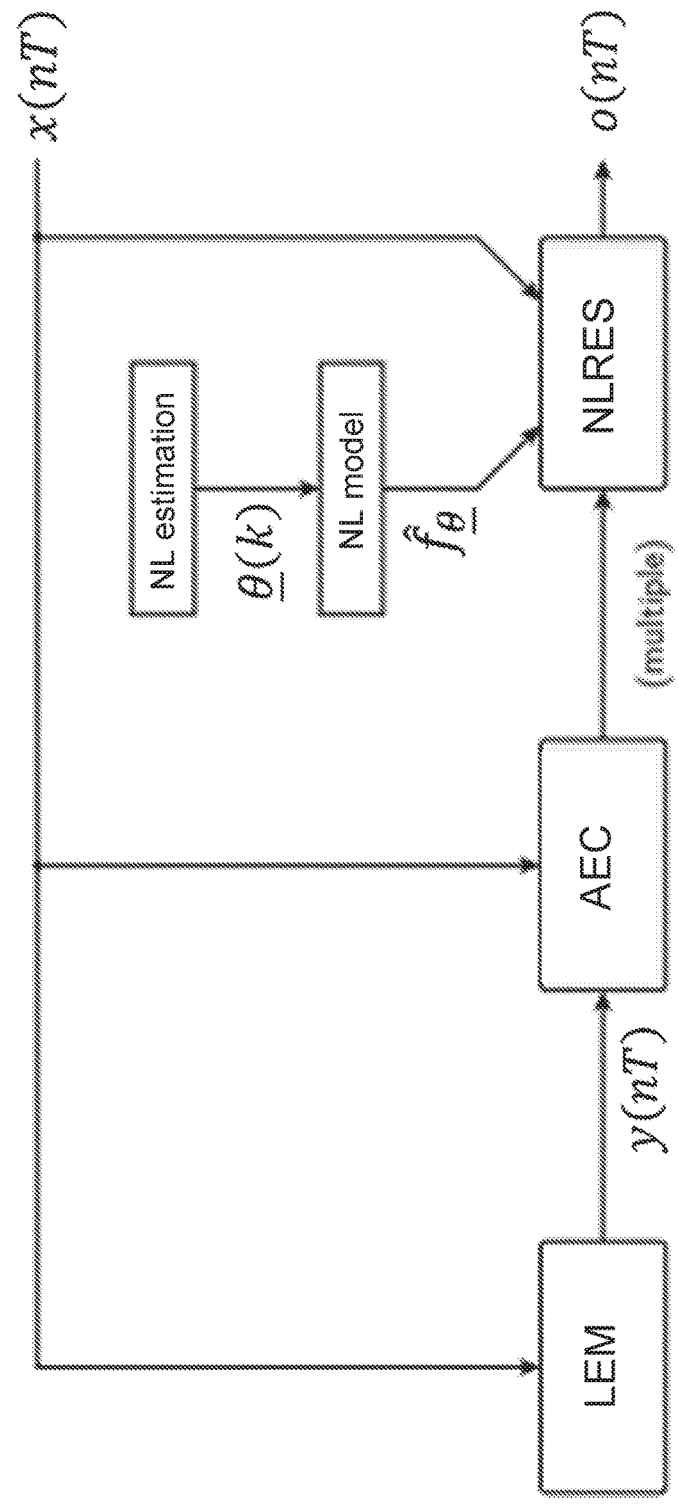
FIG. 9 is a diagrammatic view of a system configured to implement an echo suppression process in accordance with an embodiment of the present disclosure.

Embodiments described herein include a nonlinear residual echo suppression scheme that utilizes an estimated distortion function $f_{\underline{\theta}}$ with parameter vector $\underline{\theta}$ as shown in FIG. 9. The main tasks solved by our method are the approximation of the distortion function's parameter vector $\underline{\theta}$, the ensuing nonlinear residual echo PSD estimation, and combination of the linear and nonlinear residual echo power estimates.

Accordingly, embodiments of the echo suppression process included herein may comprise an AEC that may be designed to cancel some or all of the linear echo components. This may be followed by an RES stage that separately treats the residual of linear and nonlinear echo components. This separation is important because linear echo components have already been attenuated by AEC while nonlinear echo components pass the AEC without attenuation.

Embodiments may include an identification algorithm for finding the parameters of the nonlinear model as well as a combined suppression method for linear and nonlinear residual echo components.

In some embodiments, the identification algorithm is an extension of a higher-order correlation method. Embodiments may modify the estimate to directly obtain the parameters of the nonlinear distortion function rather than constantly trying to determine the current power of nonlinear echo components based on the correlation. This has a number of advantages, for example, the estimate is more accurate as it can be accumulated over time and the identification module can be switched off after system identification to save computation power. The proposed identification scheme is the first to extract and store long-term information from the correlation of nonlinear signal components. Embodiments included herein may be configured to separately treat linear and nonlinear echo components in RES. Embodiments included herein may also predict the nonlinear echo based on the estimated distortion function (e.g., from system identification) and the estimated room impulse response (e.g., from linear AEC).

In some embodiments, the suppression algorithm may estimate the power of nonlinear echo components based on the estimated room impulse response (as determined by the AEC algorithm) as well as a given loudspeaker distortion function (which can, e.g., be determined with the above identification algorithm). Finally, frequency-selective suppression may be applied to the residual echo signal. This may be performed separately for linear and nonlinear echo parts using the coupling factor method.

Figure 10:
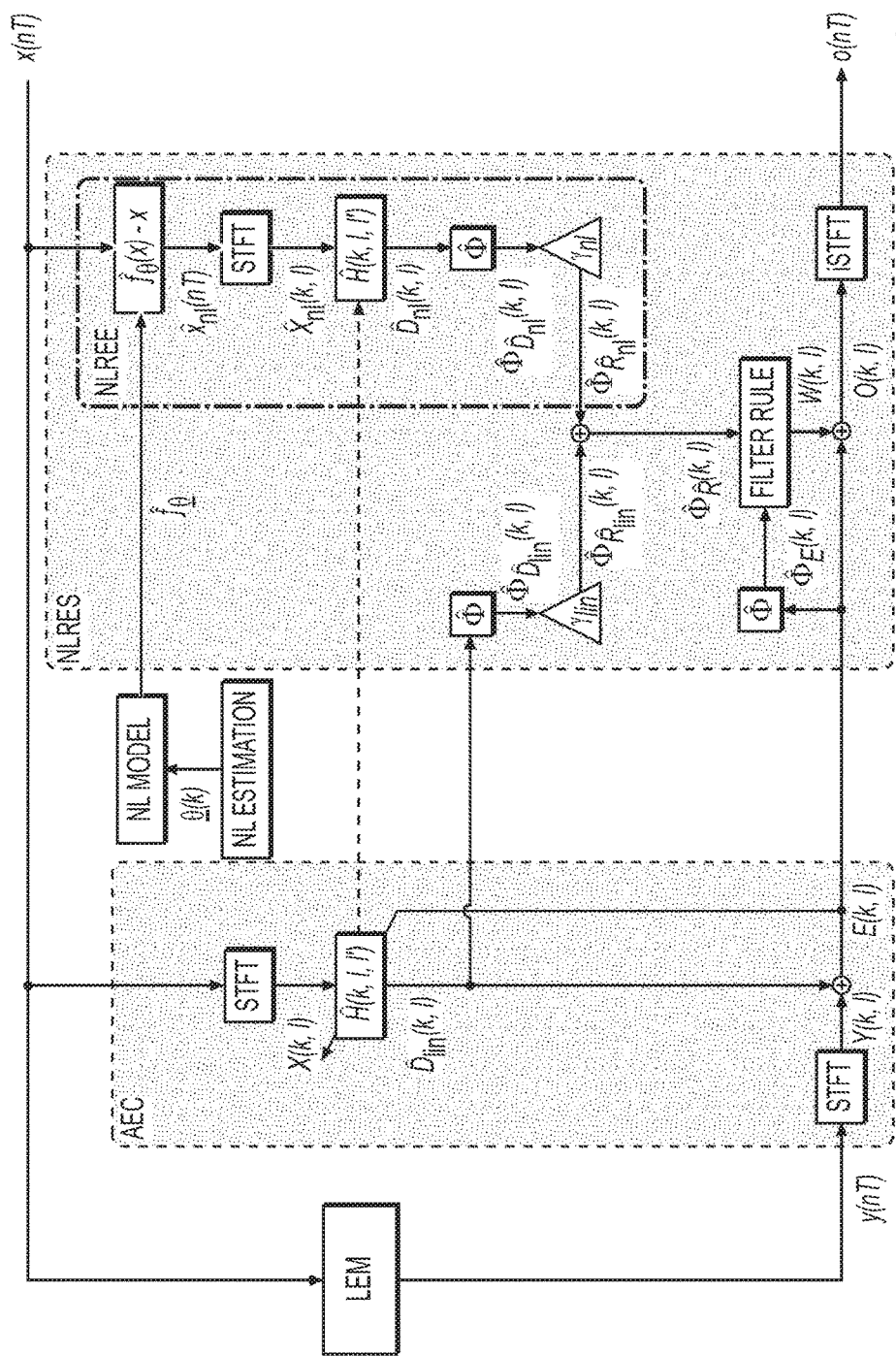
FIG. 10 is a diagrammatic view of a system configured to implement an echo suppression process in accordance with an embodiment of the present disclosure.
Figure 11:
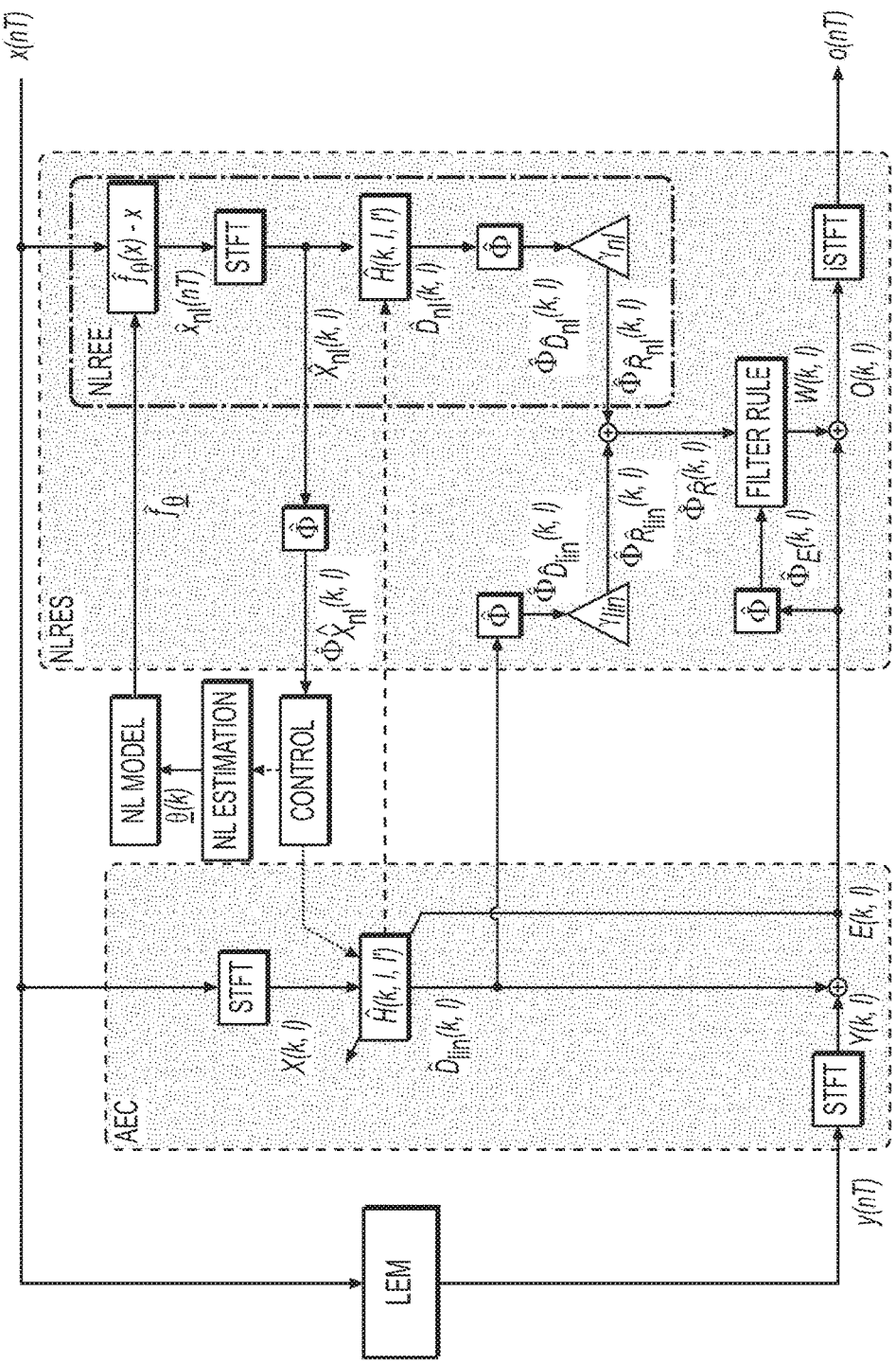
FIG. 11 is a diagrammatic view of a system configured to implement an echo suppression process in accordance with an embodiment of the present disclosure.

Referring now to FIG. 10, an embodiment presenting an example signal flow consistent with echo suppression process 10 is provided. Presuming an estimate for the distortion function $\hat{f}_{\underline{\theta}}$, this function is applied to the reference signal x. Since the linear echo is treated by the linear AEC, the reference signal is subtracted from the result to get the nonlinear reference only:

$$\hat{x}_{nl}(nT) = \hat{f}_{\underline{\theta}}(x(nT)) - x(nT).$$  Equation 25

Subsequently, the RIR as estimated by the linear AEC $\hat{H}$ may be convolved with the STFT of the nonlinear reference to get the reverberated nonlinear echo estimate:

$$\hat{D}_{nl}(k, \ell) = (\hat{H} * \hat{X}hd\ nl)(k, \ell).$$  Equation 26

Its PSD $\hat{\Phi}_{\hat{D}_{nl}}$ as well as the linear echo estimate's PSD $\hat{\Phi}_{\hat{D}_{lin}}$ are calculated in the usual way, see (1). Both are multiplied with a weighting $\gamma_{lin}$ and $\gamma_{nl}$, respectively, to get an estimate for the residual echo PSDs $\hat{\Phi}_{\hat{R}_{lin}}$ and $\hat{\Phi}_{\hat{R}_{nl}}$:

$$\hat{\Phi}_{\hat{R}_{nl}}(k, \ell) = \gamma_{nl}(k, \ell) \cdot \hat{\Phi}_{\hat{D}_{nl}}(k, \ell),$$  Equation 27 compare Equation 22 for the linear estimate.

In the linear RES, we determine a linear coupling factor estimate $\hat{c}_{lin}(k, \ell)$ and set $$\gamma_{lin}(k, \ell) = \hat{c}_{lin}(k, \ell).$$  Equation 28

Since there is no nonlinear echo cancellation on our setup, the residual nonlinear echo $R_{nl}$ is equal to the full nonlinear echo $D_{nl}$:

$$R_{nl} = D_{nl}.$$  Equation 29

Still, we reserve the possibility to influence it with $\gamma_{nl}$, which is described further below. Following Equation 23, the full residual echo PSD $\hat{\Phi}_R$ is:

$$\hat{\Phi}_R = \hat{\Phi}_{R_{lin}} + \hat{\Phi}_{R_{nl}} + \hat{\Phi}_{R_{lin}R_{nl}}.$$  Equation 30

However, we ignore the cross-power spectral density $\hat{\Phi}_{R_{lin}R_{nl}}$ in the estimate $\hat{\Phi}_{\hat{R}}$, since we can compensate for it using the weightings $\gamma_{lin}$ and $\gamma_{nl}$:

$$\hat{\Phi}_{\hat{R}} = \gamma_{lin} \cdot \hat{\Phi}_{\hat{R}_{lin}} + \gamma_{nl} \cdot \hat{\Phi}_{\hat{R}_{nl}},$$  Equation 31 so we can finally calculate the full residual echo PSD estimate:

$$\hat{\Phi}_{\hat{R}}(k, \ell) = \gamma_{lin}(k, \ell) \cdot \hat{\Phi}_{\hat{D}_{lin}}(k, \ell) + \gamma_{nl}(k, \ell) \cdot \hat{\Phi}_{\hat{D}_{nl}}(k, \ell).$$  Equation 32

Please note again the circumflex notation in the index variable that tells the difference between an estimate and the true value. The filter coefficients $W(k, \ell)$ are calculated in one of the known ways, compare Equation 15.

As is the case in a linear RES, a coupling factor can analogously be defined for the nonlinear echo estimate:

$$c_{nl} = \frac{\mathcal{E}_{(|R|^2)}}{\mathcal{E}_{(|\hat{D}_{nl}|^2)}}.$$  Equation 33

The nonlinear coupling factor must also be estimated:

$$\hat{c}_{nl}(k, \ell) = \frac{\hat{\mathcal{E}}(|R_{nl}(k, \ell)|^2)}{\hat{\mathcal{E}}(|\hat{D}_{lin}(k, \ell)|^2)}.$$  Equation 34

This can be done in local silence and when the linear AEC has converged, since:

$$S = 0 \wedge N = 0 \wedge D_{lin} \approx \hat{D}_{lin} \Rightarrow E \approx R_{nl}.$$  Equation 35

It turns out that in the proposed setup, the estimated distortion function $\hat{f}$ can be as simple as a hard clipping:

$$f_\theta(x) = \begin{cases} -\theta, & x < -\theta, \\ \theta, & x > \theta, \\ x, & \text{otherwise} \end{cases} \quad \text{Equation 36}$$

and still yield adequate nonlinear echo suppression, if the coupling factors are used to compensate for over- or underestimation of the nonlinear echo PSD:

$$\gamma_{nl}(k,\ell) = \hat{c}_{nl}(k,\ell). \quad \text{Equation 37}$$

Still, the clipping threshold $\theta$ is a parameter that must be approximated to match the true distortion function $f$ as closely as possible. This is done by calculating an average coupling factor $\bar{c}$ for the nonlinear echo estimate over a frequency band between $k^-$ and $k^+$ for each frame:

$$\bar{\hat{c}}_{nl}(\ell) = \frac{1}{1+k^+-k^-}\sum_{k=k^-}^{k^+}\hat{c}_{nl}(k,\ell). \quad \text{Equation 38}$$

Given local silence, the mean nonlinear echo coupling factor gives a hint on whether the estimated distortion clips more than the true distortion or less: If it is unitary, this means that there is as much power in the estimated nonlinear echo as in the AEC output:

$$\hat{\Phi}_E = \hat{\Phi}_{\hat{D}_{nl}} \Rightarrow \bar{\hat{c}}_{nl} \approx 1. \quad \text{Equation 39}$$

When there is too much power in the estimate, the coupling factor becomes smaller than one:

$$\hat{\Phi}_E = \hat{\Phi}_{\hat{D}_{nl}} \Rightarrow \bar{\hat{c}}_{nl} < 1; \quad \text{Equation 40}$$

conversely, it grows beyond one if there is insufficient power in the estimate:

$$\hat{\Phi}_E > \hat{\Phi}_{\hat{D}_{nl}} \Rightarrow \bar{\hat{c}} > 1. \quad \text{Equation 41}$$

This information is used to modify the estimated distortion function's clipping threshold for more or less clipping according to the rule:

$$\theta_1(\ell) = \theta_1(\ell-1) + v(\ell)(1-\bar{\hat{c}}_{nl}(\ell)), \quad \text{Equation 42}$$

where $v(\ell)$ controls the adaptation step size.

The above method may be extended by introducing an additional softness parameter. This is motivated by the observation that hard clipping functions create more intense overtones and thus spread the spectrum further than a softer clipping function does. The frequency dependent nonlinear coupling factor gives an indication on whether higher frequencies are over- or underrepresented in the nonlinear echo PSD estimate. A linear fit over the frequency-dependent coupling factor is performed in each frame. The resulting slope parameter m is used for the adaptation of the softness parameter: If the estimated clipping is too hard, then high frequency components are overrepresented, and the slope becomes greater than zero. Conversely, if the estimated clipping is too soft, then high frequency components are underrepresented, and the slope becomes smaller than zero. The softness parameter is adjusted accordingly:

$$\theta_2(\ell) = \theta_2(\ell-1) + v_2(\ell) \cdot m(\ell), \quad \text{Equation 43}$$

where $v_2(\ell)$ controls the adaptation step size. The consolidated parameter vector $\underline{\theta}$ is then:

$$\underline{\theta} = [\theta_1, \theta_2]^T. \quad \text{Equation 44}$$

Suppose a set of basis functions as in Equation 11 but without weightings:

$$\hat{f}_\underline{\theta}(x) = \sum_{i=0}^{I-1} f_i(x) \quad \text{Equation 45}$$

producing a signal vector $\underline{x}_{dis}$ with $$x_i(nT) = f_i(x(nT)). \quad \text{Equation 46}$$

The sub-band representation is then denoted $X_i(k,\ell)$. In some embodiments, the process may extract and retain long-term information about arbitrary basis function model weightings. Additional detail may be found hereinbelow.

In the examples provided below the following notation may apply, reference signal x, microphone signal y, echo signal d, room impulse response h, monomials $m_i(x) = x^i$. In this example, nonlinear distortion at loudspeaker may be modeled as a saturation function with polynomial approximation $f(x) = \sum_{i=1}^{N}\alpha_i m_i(x)$; microphone signal is convolution of loudspeaker output $f(x)$ with room impulse response h:

$$d = h * \sum_{i=1}^{N}\alpha_i m_i(x) \quad \text{Equation 47}$$

Embodiments may be configured to estimate saturation function as a polynomial approximation $\hat{f}(x) = \sum_{i=1}^{N}\hat{\alpha}_i m_i(x)$ from given x and y.

In some embodiments, translation to the frequency domain may be achieved as discussed below. Let $X(\omega,t)$ denote the STFT of x, and let $Y(\omega,t)$, $F(\omega,t)$ and $M_i(\omega,t)$ denote the STFTs of y, $f(x)$ and $m_i(x)$. Then, the relation between microphone and reference signal is:

$$D(\omega,t) = H(\omega,t) \cdot \sum_{i=1}^{N}\alpha_i M_i(\omega,t) \quad \text{Equation 48}$$

due to the linearity of the Fourier transform.

One approach for residual echo suppression may be found in "*A Residual Echo Suppression Technique for System with Nonlinear Acoustic Echo Path*", Kun Shi, et al., Institute for Electrical and Electronics Engineers: International Conference on Acoustics, Speech and Signal Processing 2008. This approach can be formulated as to estimate a gain G such that:

$$\hat{D}(\omega,t) = G^H(\omega,t) \cdot M(\omega,t) \quad \text{Equation 49}$$

where $M(\omega,t) = [M_1(\omega,t) \ldots M_N(\omega,t)]^T$. This gain G is calculated as a minimum mean square error estimate:

$$G = S_{MM}^{-1} s_{MY}$$

where $S_{MM}$ and $s_{MY}$ are calculated according to:

$$S_{MM}(\omega) = E\begin{bmatrix} M_1(\omega,t)M_1(\omega,t) & \cdots & M_1(\omega,t)M_N(\omega,t) \\ \vdots & \ddots & \vdots \\ M_N(\omega,t)M_1(\omega,t) & \cdots & M_N(\omega,t)M_N(\omega,t) \end{bmatrix} \quad \text{Equation 50}$$

$$s_{MY}(\omega) = E[M_1(\omega,t)Y(\omega,t) \cdots M_N(\omega,t)Y(\omega,t)]^T$$

In some embodiments, the present disclosure may be configured to estimate polynomial coefficients without the impulse response. In order to better understand Kun Shi's estimate, let us first of all assume that the impulse response is a Dirac delta, i.e. $H(\omega,t) = 1$. Then we have:

$$D(\omega,t) = \sum_{i=1}^{N}\alpha_i M_i(\omega,t) = \alpha^H \cdot M(\omega,t) \quad \text{Equation 51}$$

with $\alpha = [\alpha_1 \ldots \alpha_N]^T$. Hence, the $G_i$ provides an estimate $\hat{\alpha}_i$ of the $\alpha_i$, as $\hat{f}(x) = \sum_{i=1}^{N}\hat{\alpha}_i m_i(x)$. But this holds only if there is no impulse response h between y and m.

In some embodiments, the present disclosure may be configured to estimate polynomial coefficients without the impulse response. If the h is not a Dirac delta, the above estimate can still be used if we convolve the $m_i$ with h before calculating the correlations. In this case, the $M_i$ contain the H and the $G_i$ still determine the polynomial coefficients due to the linearity of convolution and Fourier transform with $X^i$ denoting the Fourier transform of $x^i$:

$$D(\omega, t) = \sum_{i=1}^{N} \alpha_i M_i(\omega, t) = \sum_{i=1}^{N} \alpha_i H(\omega, t) X^i(\omega, t) = H(\omega, t) \sum_{i=1}^{N} \alpha_i X^i(\omega, t)$$

Equation 52

This may further include performing a complex division of $G_i$ by the linear factor $G_1$ in order to compensate for the linear part, i.e. the impulse response H. This may be seen by writing the complex number $G_i$ as follows: $G_i = a_i e^{j\varphi_i}$. Then $G_1^{-1}$ is $G_1^{-1} = 1/a_1 \cdot e^{-j\varphi_t}$, which compensates for the change in amplitude due to H as well as the change in phase. But this will work only for short impulse responses that fit into on FFT length.

In some embodiments, a control mechanism may be used to control the adaptation of the linear AEC and the nonlinear NLREE modules. The linear AEC will converge better whenever there is no nonlinear distortion present. The setup is shown in FIG. 10. At times where nonlinear distortion occurs, adaptation of the AEC is hence paused by setting the adaptation step size µ to zero, compare Equation 9. On the other hand, no information can be gathered about the nonlinear distortion function $f$ at times where the reference signal x stays in the function's linear region. Adaptation of the estimated nonlinear parameter vector $\underline{\theta}$ is halted in these cases by setting the corresponding step sizes to zero, compare Equations 42, 43. Both parameters, $\theta_1$ and $\theta_2$ can be adapted independently at the same time.

Figure 12:
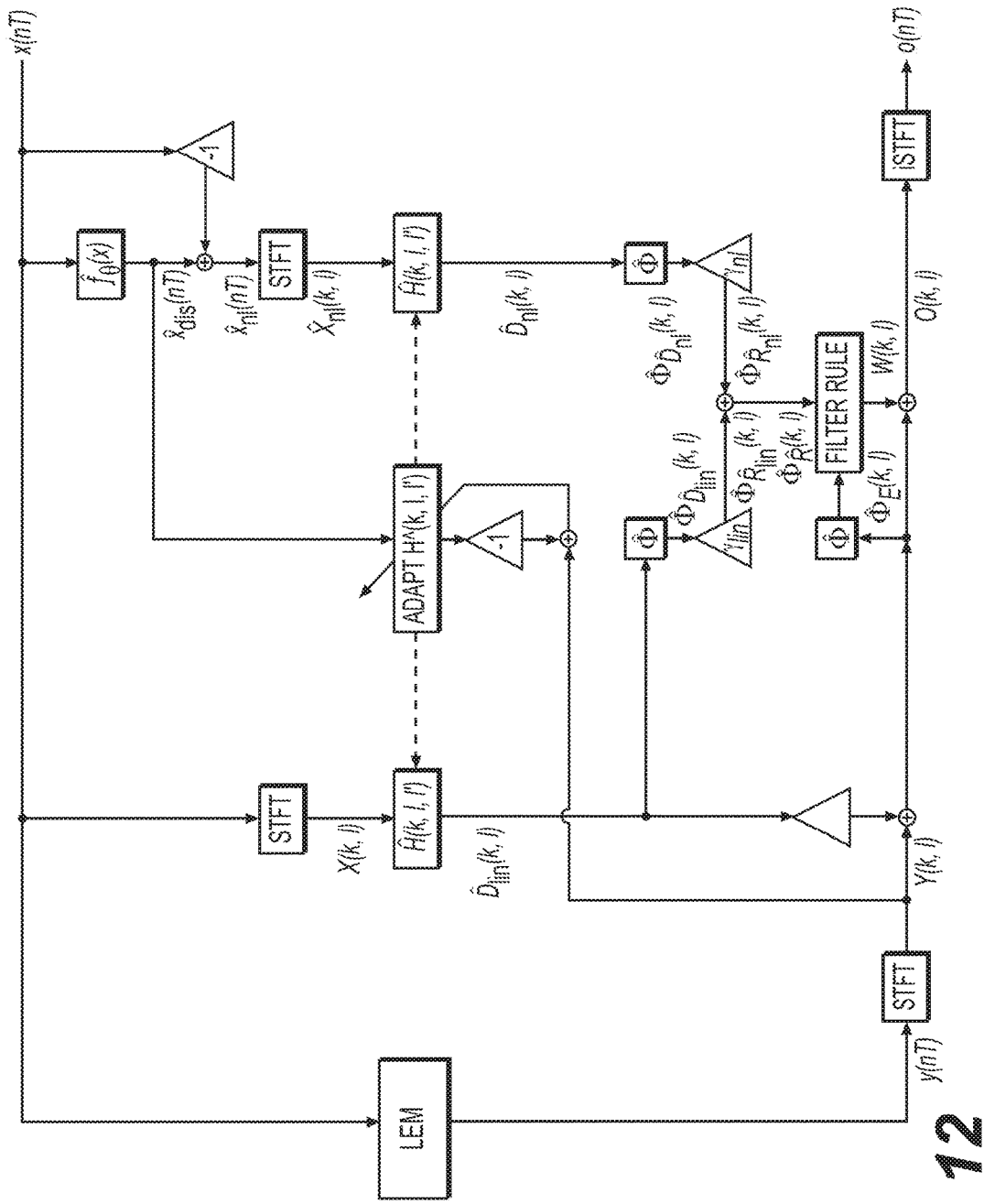
FIG. 12 is a diagrammatic view of a system configured to implement an echo suppression process in accordance with an embodiment of the present disclosure.

Referring now to FIG. 12, an embodiment configured to separate estimation (=adaptation) of $\hat{H}$ from its application, i.e., convolution with a signal. Motivation: Since $x_{dis}$ is what the real room actually gets, the filter $\hat{H}$ should receive the corresponding estimate $x_{dis}$ as its input, so it will converge better and the adaptation never has to be paused. As you can see from the signal flow, the output of the adaptation module is only used for its own adaptation, not to produce an output signal, which would be much more susceptible to estimation errors.

Figure 13:
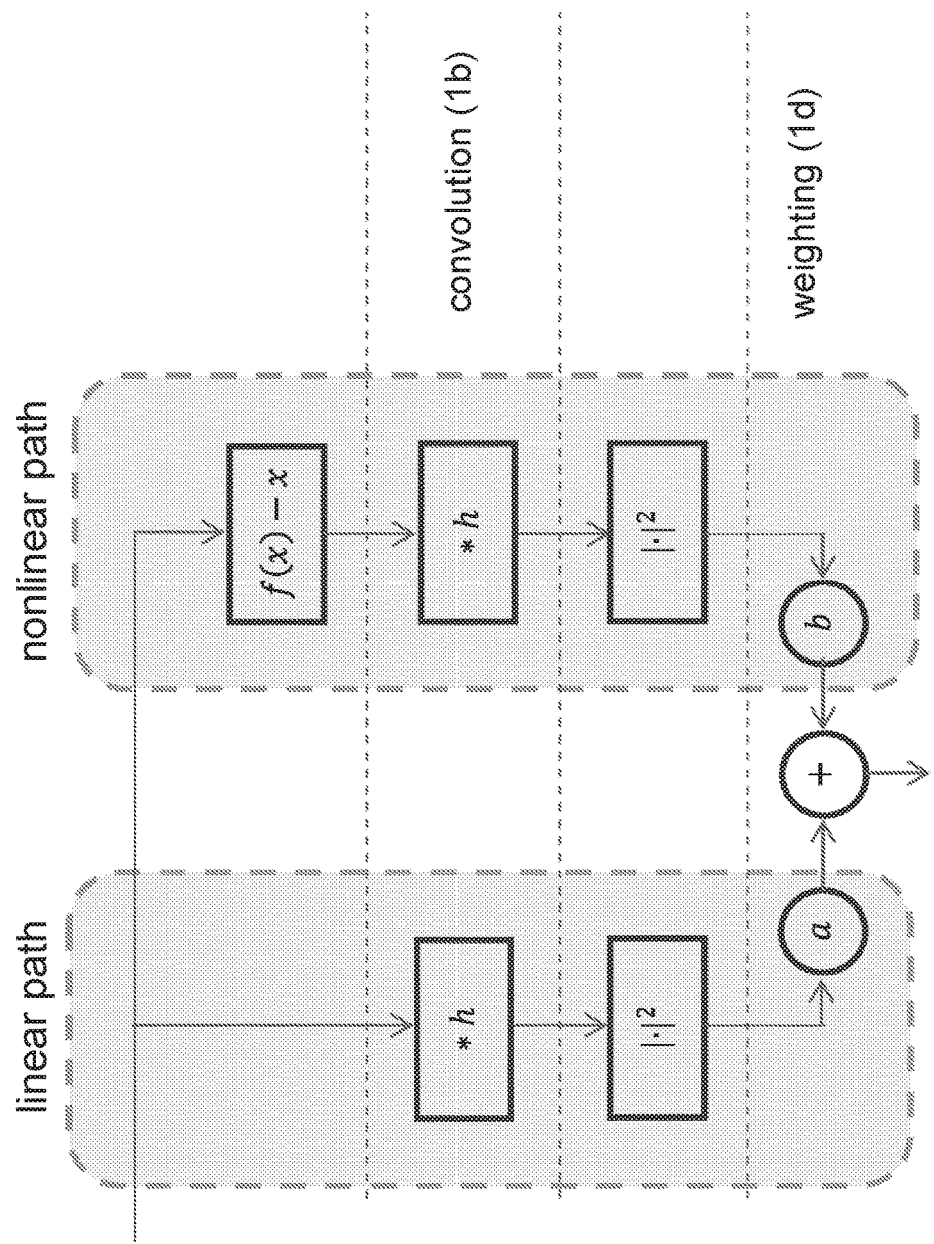
FIG. 13 is a diagrammatic view of a system configured to implement an echo suppression process in accordance with an embodiment of the present disclosure.

Referring now to FIG. 13, an embodiment of a system consistent with echo suppression process 10 is provided. The residual echo suppression system shown in FIG. 13 may be configured to calculate the residual echo power of linear and nonlinear echo components in two separate paths. In a first path, the original reference signal x (referred to as the linear path); and in a second path for the signal that results from first applying said distortion function $f$ to the reference signal and then again subtracting the reference signal: $f(x)-x$ (referred to as the nonlinear path). The system may convolve each of the input signals of the two the paths above, i.e. x and $f(x)-x$, with the room impulse response h, as estimated by a linear echo canceller, or a shortened version thereof, also if the convolution is performed in the frequency domain. The system may estimate the powers of the two individual paths above. The system may be configured to calculate a combined echo power estimate as a weighted sum of the powers of the two individual paths above. For example, if this is done individually in different frequency bands (e.g. for each frequency in the frequency domain) or if the power is determined through auto-correlation.

In some embodiments, one or both of the weights used in the weighted sum above may include coupling factors that relate the power estimate of the respective path to the power of the microphone signal or the signal after echo cancellation. The coupling factors may either be broadband or frequency-dependent. For the linear path, the coupling factor may be calculated as the ratio between the power of the error signal from AEC and the power estimate of the linear path. For the nonlinear path, the coupling factor may be calculated as the ratio between the power of the error signal from AEC and the power estimate of the nonlinear path. In some embodiments, the magnitude may be used instead of the power.

In some embodiments, the distortion function may be estimated based on the coupling factor of the nonlinear path. This coupling factor may be either broadband or calculated for individual frequency bands.

Some embodiments may adapt a saturation function with one clipping threshold parameter based on the broadband power ratio. Additionally and/or alternatively, some embodiments may adapt a saturation function with one clipping threshold and one shape parameter based on the broadband power ratio and the slope of the power ratio in frequency (or, more general, via differences of the power ratios in frequency).

In some embodiments, the distortion function may be estimated adaptively (e.g. using magnitude in lieu of power) and in which adaptation control (i.e. the decision whether the distortion function shall be adapted) may be based on the broadband coupling factor of the nonlinear path. A practical implementation may compare a function of the power ratio to a threshold. The motivation here is to use the power ratio as a measure for the current adaptation quality of the estimated distortion function. For a perfect fit, the ratio should be equal to one. Deviations from 1 may indicate a mismatch between the true and estimated distortion functions.

In some embodiments, the system may include an echo canceller, in which adaptation control of the echo canceller (i.e. the decision whether the EC shall be adapted) is based on a comparison of the power estimates of the linear and nonlinear paths. This comparison may be performed individually for each frequency band in order to individually control the adaptation. Accordingly, the echo canceller may only be adapted in frequency bands where the linear part of the echo is significantly stronger than its nonlinear part (e.g., due to distortion at the loudspeaker).

In some embodiments, the distortion function may be approximated by a polynomial:

$$f(x(t)) = \alpha_1 x^1(t) + \ldots + \alpha_N x^N(t)$$

Equation 53 and in which the polynomial coefficients are estimated based on the following two items: i) the correlation between the monomials:

$$d^1(t), \ldots, d^N(t)$$

Equation 54 and ii) the cross-correlation of each of these monomials with the microphone signal y. Here d denotes x*h, i.e. the reference signal convolved with the room impulse response as estimated by a linear echo canceller. The correlation may be calculated either in the time domain or in frequency domain and it may be averaged over different period of time. To give a particular implementation, the polynomial coefficient $\alpha_i$ may be calculated by averaging the following expression over frequency and/or time (where superscript-"*" denotes complex conjugation):

$$\tilde{\alpha}_i = E\left\{\begin{bmatrix} d^1(t)(d^1(t))^* & \cdots & d^1(t)(d^N(t))^* \\ \vdots & \ddots & \vdots \\ d^N(t)(d^1(t))^* & \cdots & d^N(t)(d^N(t))^* \end{bmatrix}^{-1}\right\} E\left\{\begin{bmatrix} d^1(t)y(t) \\ \vdots \\ d^N(t)y(t) \end{bmatrix}\right\} \quad \text{Equation 55}$$

In some embodiments, the polynomial coefficients may be estimated based on the correlation between the monomials $x^1(t), \ldots, x^N(t)$ instead of $d^1(t), \ldots, d^N(t)$ and their cross-correlation to the microphone signal y. In this case, the polynomial coefficient may be calculated by averaging the following expression over frequency and/or time:

$$\tilde{\alpha}'_i = \frac{\tilde{\alpha}_i}{\tilde{\alpha}_1} \quad \text{Equation 56}$$

It should be noted that instead of polynomial bases, any other viable basis may be used, e.g., truncated odd Fourier series, piecewise linear bases, etc.

In one implementation of the present disclosure, a method for residual echo suppression is provided. The method may include receiving an original reference signal and applying a distortion function to the original reference signal to generate a second signal. The method may include generating a non-linear signal from the distortion function that does not include linear components of the original reference signal. The method may also include calculating a residual echo power of a linear component and a non-linear component, wherein the linear component is based upon the original reference signal and the non-linear component is based upon the non-linear signal. The method may further include applying a room model to each of the original reference signal and the non-linear signal and estimating a power associated with the original reference signal and the non-linear signal. The method may include calculating a combined echo power estimate as a weighted sum of a weighted power associated with the original reference signal and a weighted power associated with the non-linear signal.

One or more of the following features may be included. In some embodiments, the application of the room model may include convolving each of the original reference signal and the non-linear signal with a room impulse response. The room impulse response may be estimated using a linear echo canceller. At least one of the weighted power associated with the reference signal and the weighted power of the non-linear signal used in the weighted sum may include one or more coupling factors. The coupling factors may differ between the linear component and the non-linear component. In some embodiments, a magnitude may be used instead of the power. The distortion function may be estimated based upon, at least in part, a coupling factor associated with the non-linear signal. The coupling factor may include at least one of broadband or an individual frequency band calculation. Generating a non-linear signal may include subtracting the original reference signal from the second signal to generate a non-linear signal. The distortion function may be approximated by a weighted sum of a suitable set of basis functions, such as monomials, wherein one or more weights of the basis functions may be estimated based upon, at least in part, a correlation between a plurality of basis functions that have been applied to the reference signal and a cross-correlation of each of the plurality of basis functions that have been applied to the reference signal with the microphone signal.

It should be noted that monomials are a suitable set of base functions—a weighted sum of them is a polynomial. But this is not the most general case of what we would like to protect with this patent. Other sets of base functions work just as well, for example a truncated odd Fourier series [Malik, S., & Enzner, G. (2011). Fourier expansion of Hammerstein models for nonlinear acoustic system identification. In *ICASSP* (pp. 85-88). Bochum: IEEE. doi: 10.1109/ICAS SP.2011.5946334], or piecewise linear decompositions [Shimauchi, S., & Haneda, Y. (2012). Nonlinear Acoustic Echo Cancellation Based on Piecewise Linear Approximation with Amplitude Threshold Decomposition. In *International Workshop on Acoustic Signal Enhancement; Proceedings of IWAENC* 2012 (pp. 1-4). Aachen, Germany.]

Embodiments of the present disclosure may run on any suitable device. For example, the process may run locally on embedded systems, where resources are much scarcer, such as a mobile device, a home TV, an automobile, etc.

In some embodiments, the distortion function may be approximated by a weighted sum of a plurality of suitable basis functions and wherein one or more coefficients of said basis functions are estimated based upon, at least in part, a correlation between a plurality of functions applied to the original reference signal and a cross-correlation of each of the plurality of said functions with the microphone signal. These functions, as opposed to the suitable basis function mentioned above may include a convolution with a room impulse response.

Figure 14:
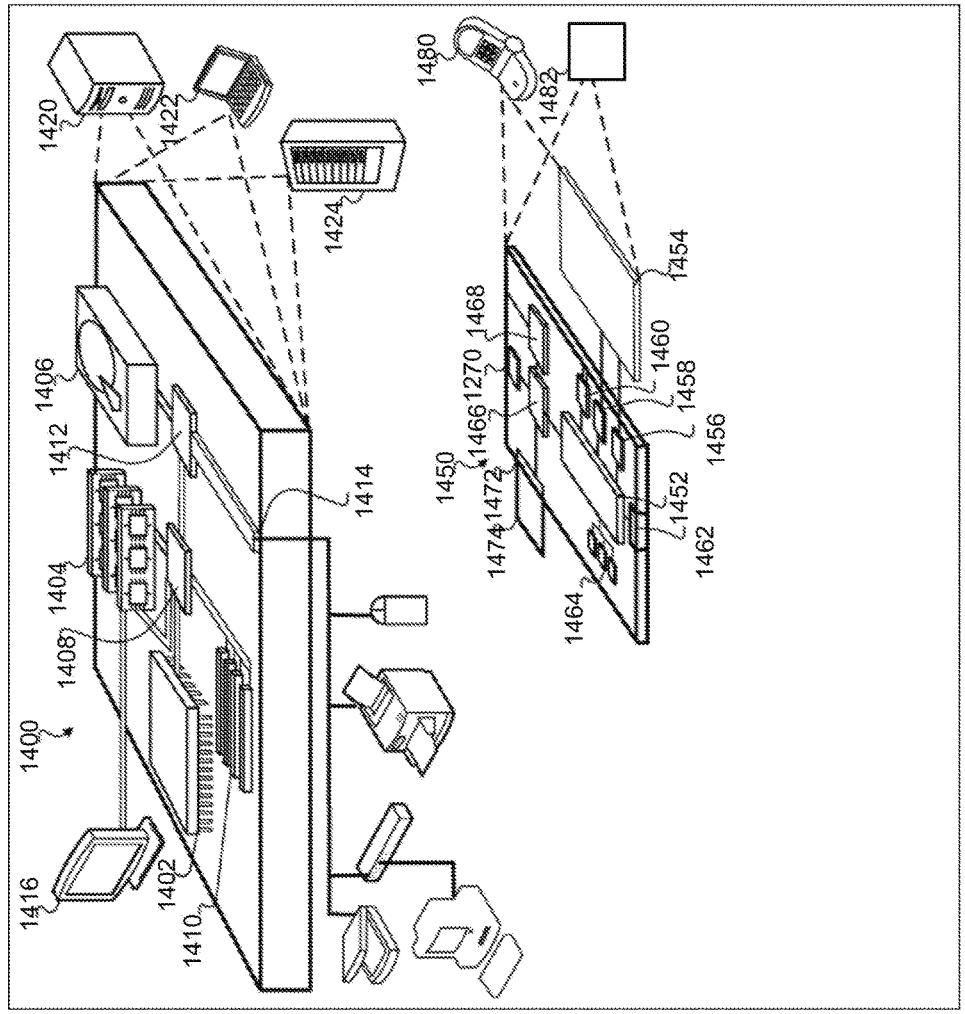
FIG. 14 shows an example of a computer device and a mobile computer device that can be used to implement embodiments of the present disclosure.

Referring now to FIG. 14, an example of a generic computer device 1400 and a generic mobile computer device 1450, which may be used with the techniques described here is provided. Computing device 1400 is intended to represent various forms of digital computers, such as tablet computers, laptops, desktops, workstations, personal digital assistants, servers, blade servers, mainframes, and other appropriate computers. In some embodiments, computing device 1450 can include various forms of mobile devices, such as personal digital assistants, cellular telephones, smartphones, and other similar computing devices. Computing device 1450 and/or computing device 1400 may also include other devices, such as televisions with one or more processors embedded therein or attached thereto as well as any of the microphones, microphone arrays, and/or speakers described herein. The components shown here, their connections and relationships, and their functions, are meant to be exemplary only, and are not meant to limit implementations of the inventions described and/or claimed in this document.

In some embodiments, computing device 1400 may include processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, may be interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multiprocessor system).

Memory 1404 may store information within the computing device 1400. In one implementation, the memory 1404 may be a volatile memory unit or units. In another implementation, the memory 1404 may be a non-volatile memory unit or units. The memory 1404 may also be another form of computer-readable medium, such as a magnetic or optical disk.

Storage device 1406 may be capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, memory on processor 1402, or a propagated signal.

High speed controller 1408 may manage bandwidth-intensive operations for the computing device 1400, while the low speed controller 1412 may manage lower bandwidth-intensive operations. Such allocation of functions is exemplary only. In one implementation, the high-speed controller 1408 may be coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 may include a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, may be interconnected using various buses, and several of the components may be mounted on a common motherboard or in other manners as appropriate.

Processor 1452 may execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

In some embodiments, processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

In some embodiments, memory 1464 may store information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

Computing device 1450 may be implemented in a number of different forms, as shown in the figure. For example, it may be implemented as a cellular telephone 1480. It may also be implemented as part of a smartphone 1482, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method for residual echo suppression comprising:
receiving, at a processor, an original reference signal and applying a distortion function to the original reference signal to generate a second signal;
generating a non-linear signal from the distortion function that does not include linear components of the original reference signal;
calculating a residual echo power of a linear component and a non-linear component, wherein the linear component is based upon, at least in part, the original reference signal and the non-linear component is based upon, at least in part, the non-linear signal;
applying a room model to each of the original reference signal and the non-linear signal;
estimating a power associated with the original reference signal and the non-linear signal; and
calculating a combined echo power estimate as a weighted sum of a weighted original reference signal power and a weighted non-linear signal power.

2. The method for residual echo suppression of claim 1, wherein the application of the room model includes convolving each of the original reference signal and the non-linear signal with a room impulse response.

3. The method for residual echo suppression of claim 2, wherein the room impulse response is estimated using a linear echo canceller.

4. The method for residual echo suppression of claim 1, wherein at least one of the weighted original reference signal power and the weighted non-linear signal power used in the weighted sum include one or more coupling factors.

5. The method for residual echo suppression of claim 4, wherein, the coupling factors differ between the linear component and the non-linear component.

6. The method for residual echo suppression of claim 1, wherein a magnitude is used instead of the power.

7. The method for residual echo suppression of claim 4, wherein the distortion function is estimated based upon, at least in part, a coupling factor associated with the non-linear signal.

8. The method for residual echo suppression of claim 7, wherein the coupling factor includes at least one of broadband or an individual frequency band calculation.

9. The method for residual echo suppression of claim 1, wherein generating a non-linear signal includes subtracting the original reference signal from the second signal to generate a non-linear signal.

10. The method for residual echo suppression of claim 1, wherein the distortion function is approximated by a polynomial and wherein one or more coefficients of the polynomial are estimated based upon, at least in part, a correlation between a plurality of monomials and a cross-correlation of each of the plurality of monomials with the original reference signal.

11. The system for residual echo suppression of claim 1, wherein generating a non-linear signal includes subtracting the original reference signal from the second signal to generate a non-linear signal.

12. The system for residual echo suppression of claim 1, wherein the distortion function is approximated by a polynomial and wherein one or more coefficients of the polynomial are estimated based upon, at least in part, a correlation between a plurality of monomials and a cross-correlation of each of the plurality of monomials with the original reference signal.

13. A system for residual echo suppression comprising:
a speaker;
a microphone; and
a processor configured to perform one or more operations including:
receiving, at a processor, an original reference signal and applying a distortion function to the original reference signal to generate a second signal;
generating a non-linear signal from the distortion function that does not include linear components of the original reference signal;
calculating a residual echo power of a linear component and a non-linear component, wherein the linear component is based upon, at least in part, the original reference signal and the non-linear component is based upon, at least in part, the non-linear signal;
applying a room model to each of the original reference signal and the non-linear signal;
estimating a power associated with the original reference signal and the non-linear signal; and
calculating a combined echo power estimate as a weighted sum of a weighted original reference signal power and a weighted non-linear signal power.

14. The system for residual echo suppression of claim 13, wherein the application of the room model includes convolving each of the original reference signal and the non-linear signal with a room impulse response.

15. The system for residual echo suppression of claim 14, wherein the room impulse response is estimated using a linear echo canceller.

16. The system for residual echo suppression of claim 13, wherein at least one of the weighted original reference signal power and the weighted non-linear signal power used in the weighted sum include one or more coupling factors.

17. The system for residual echo suppression of claim 16, wherein, the coupling factors differ between the linear component and the non-linear component.

18. The system for residual echo suppression of claim 13, wherein a magnitude is used instead of the power.

19. The system for residual echo suppression of claim 16, wherein the distortion function is estimated based upon, at least in part, a coupling factor associated with the non-linear signal.

20. The system for residual echo suppression of claim 19, wherein the coupling factor includes at least one of broadband or an individual frequency band calculation.

* * * * *